Oct. 8, 1935.  W. J. AITKEN  2,016,662
VEHICLE HANDLING AND STORING APPARATUS
Filed Nov. 4, 1933    7 Sheets-Sheet 2

INVENTOR.
William J Aitken
BY Frank J Schraeder Jr
ATTORNEY.

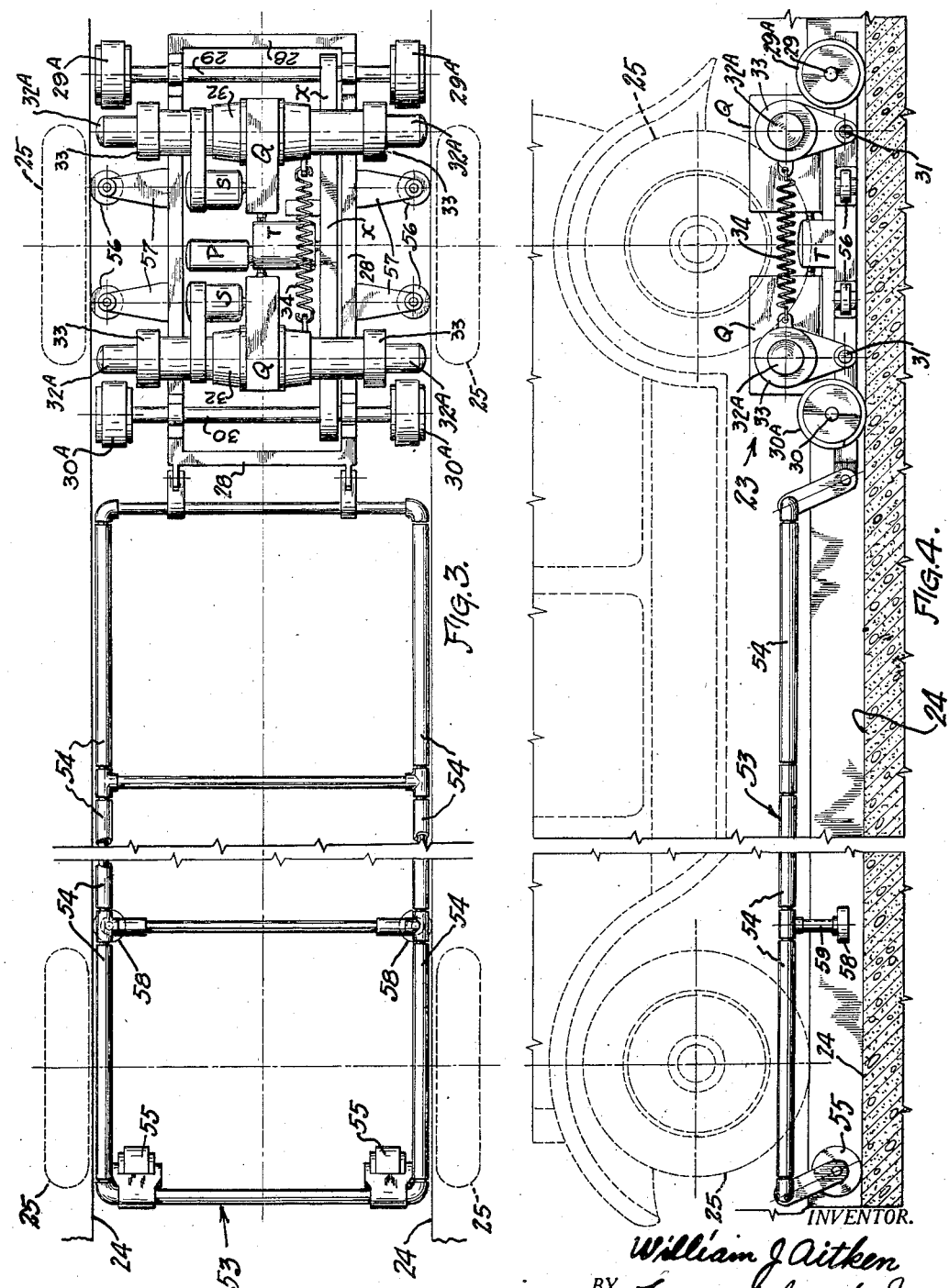

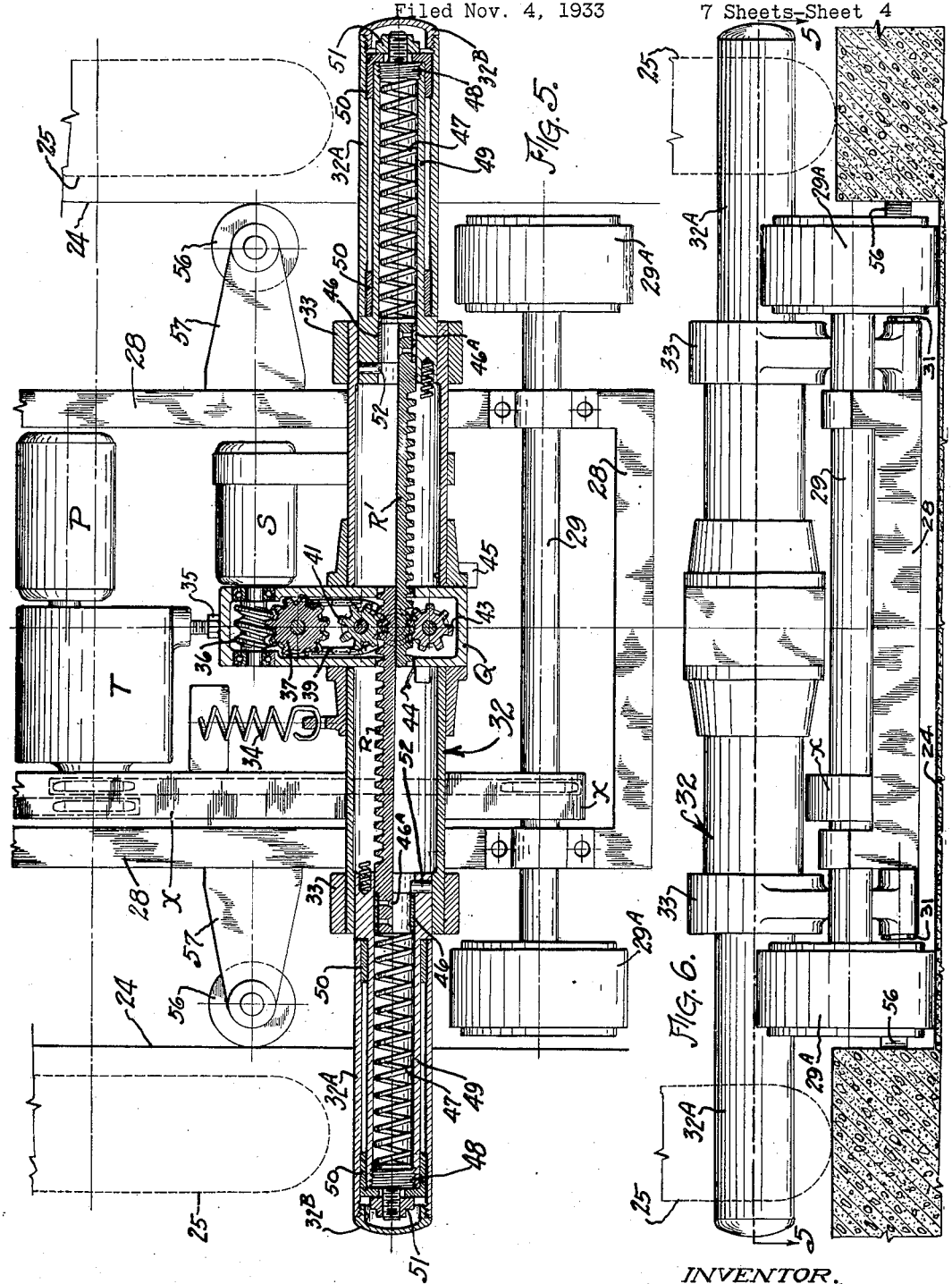

Oct. 8, 1935.  W. J. AITKEN  2,016,662
VEHICLE HANDLING AND STORING APPARATUS
Filed Nov. 4, 1933   7 Sheets—Sheet 5

INVENTOR.
William J. Aitken
BY Frank Schraeder Jr
ATTORNEY.

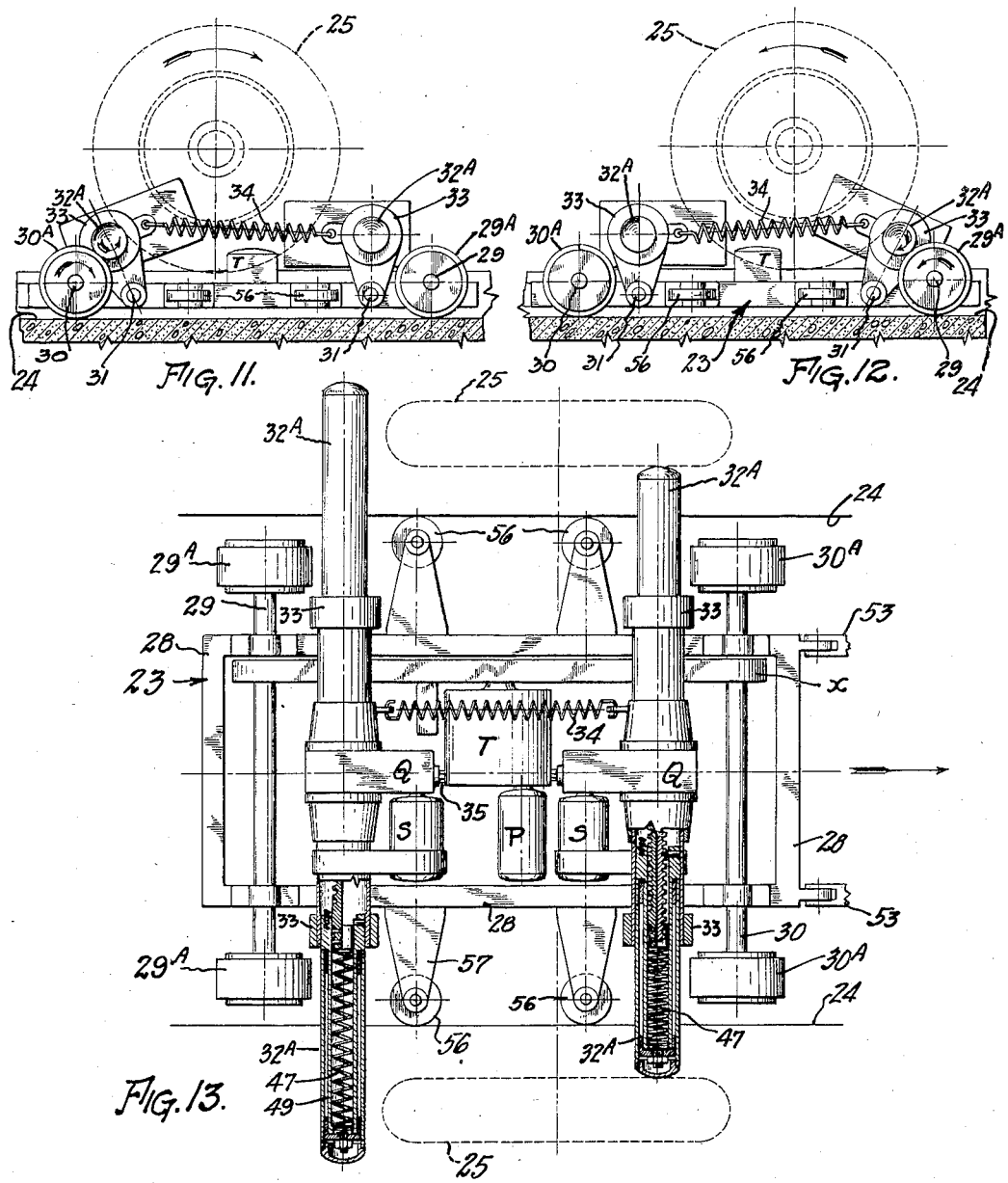

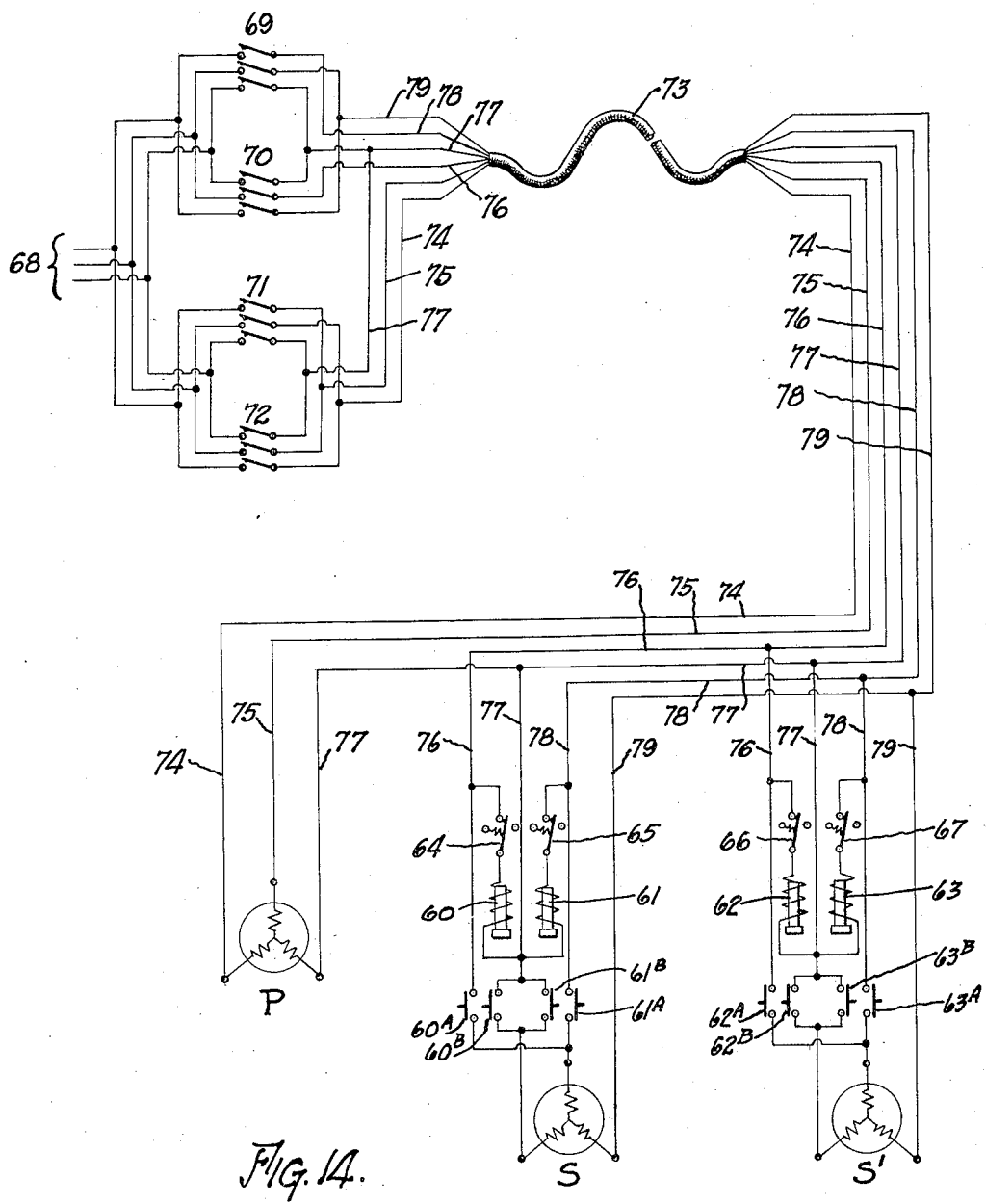

Patented Oct. 8, 1935

2,016,662

UNITED STATES PATENT OFFICE 2,016,662

VEHICLE HANDLING AND STORING APPARATUS

William J. Aitken, Chicago, Ill.

Application November 4, 1933, Serial No. 696,636

9 Claims. (Cl. 254—35)

This invention relates to automobile handling and storing appartus for use in various types of structures and buildings wherein automobiles may be moved about and stored or parked at high speeds with safety and without necessitating the direct operation of the automobiles.

The driver of the automobile simply drives his car into the lower floor of the building, releases the brakes and locks his car so that it cannot be operated by others. The operatives then manipulate a parking device or parker which contacts and rotates the wheels of the automobile by directly applied rotary power, thereby moving the automobile onto the elevator where it is raised to any given floor of the building and by the same parking device is moved by directly applied rotary power into some predetermined parking or storage space. When the owner calls for his automobile the same apparatus remotely controlled by the operatives, delivers the automobile to the lower floor where the owner unlocks it and drives away.

Years of actual operation of multiple floor storage garages with mechanical type parking equipment has disclosed the advantage of higher speed parking equipment than that in present use in order to satisfy the quick delivery demands of the automobile owners who park their motor cars in the congested sections of large cities.

The safe speed of present type mechanical parking equipment is controlled by four limiting factors:

1. The method of attachment of the parker to the automobile. Present methods consist of spring pressure applied against a part of the automobile. This pressure must be so great that it practically lifts the automobile off its wheels, otherwise, slippage will result when the automobile is moved by the parker.

2. The pushing effect required to overcome the inertia of the automobile and the braking effect required to stop same.

3. Power limitations because of clearances under automobiles. Such clearances reduce the size of propelling devices, thereby reducing the starting and operating speeds.

4. The high guide rails required on all floors for guiding the automobile wheels in straight lines result in an objectionable rubbing of the automobile tires against the vertical side of the guiding member, thereby cutting down operating speed.

In the present type of under-automobile parking devices now in use the usual practice is to reach up or out and grip some portion of the automobile to be moved, such as the rear axle, for instance. This grip must be of sufficient magnitude to overcome the inertia of starting or stopping to insure proper movement of the automobile. These present parkers rely upon a direct pushing effect to overcome this inertia, and this pushing effect places definite limitations on speed of movement beyond which it is impossible to operate with safety.

There is another advantage resulting from the direct engagement with and the driving of the automobile tires. Automobile tires are manufactured to run for long periods of time under severe road conditions and to absorb road shocks and inequalities of road surfaces, thus protecting the automobile. By direct engagement with the automobile tires, this parking device relieves all strain on the automobile's mechanical parts and exerts no lifting pressure on any part of the automobile mechanism. The automobile is simply rolled by an applied rotary power upon its own tires.

In addition to the rotary movement translated to the wheels of the automobile, there is also a direct thrust or pushing movement exerted by the driving rolls of the parking device.

It is evident that directly applied rotary power to the wheels of the automobile plus the pushing effect of the driving rolls will result in a quicker start and a quicker acceleration of the automobile and conversely to a quicker stop of the automobile when the direction of the power transmitting rolls is reversed and applied to the automobile wheels.

It is further evident that the driven roll contact with the automobile cannot be broken during the driving operation, since such contact is not established by gripping or pushing against a part of the automobile chassis.

In addition to the above advantages, there is that resulting from the elasticity of operation of the parking device. The automobile need not be placed in an exact floor position by its driver as the parking device may be run into any location convenient for engaging two tires of the automobile at the same time. The device is shown driving the two rear tires of the automobile but may be used to operate the two front tires of the automobile in the same manner.

It is an object of the present invention to overcome the disadvantages above indicated. Another object is to provide a high speed efficient parking apparatus by which an automobile may be moved onto and off of elevators and parked on or delivered to any desired space on the various floors of the building, without damage to the automobile and without utilizing the motive power of the automobile for such movement. A further object of the invention is to provide a new method of handling and moving automobiles.

One of the principal objects of the invention is to provide a parking device or parker movable under the automobile, having its own automotive power, which power may be directly exerted and translated through an intermediate driving mechanism to rotate the wheels of an automobile in either direction, thus providing for rolling the automobile forward or backward on its own tires.

Another object of the invention is to provide internal coil springs for the power transmitting rolls to afford flexible means by which the automobile tire can be contacted in the operating position at high speeds thus enabling the parking device to engage the automobile at higher speeds with safety, thereby increasing the speed of receipt and delivery of the automobile.

A further object of the present invention is to provide movable guiding means under the automobile in an extension of the parking device which provides means for guiding the other or disengaged wheels of the automobile, thereby eliminating high guide rails on the floors as now required by other parking devices. Said movable guiding means to be permanently attached to the parking device and to travel backward and forward with the parking device, thereby guiding the other wheels of the automobile in parallel lines with the parking device. Said guiding means comprising a frame with free running rollers which retain the other wheels of the automobile in alignment with the direction of travel of the automobile and eliminate the rubbing friction between the side of the automobile tire and the guide rails; such guiding means enabling the parking device to operate at higher speeds, thereby greatly increasing its efficiency.

No primary adjustment of the parking device with reference to the automobile is necessary other than that of placing the parking device in position so that upon the forward or backward movement of said parking device its power transmitting rolls will project into operating position whereby their motive power will be delivered directly to the treads of the automobile tires, for rolling the automobile wheels forward or backward.

With the above and other objects in view, my invention consists in the novel combination, construction and arrangement of the parts and members shown in preferred embodiment in the attached drawings, described in the following specifications and particularly pointed out in the appended claims.

In the drawings:—

Fig. 1 illustrates a cross-section through a garage building showing the ground floor provided with an entrance and exit at the ends thereof.

Fig. 1ᴬ is a cross-section of the floor taken on line 1ᴬ—1ᴬ of Fig. 1.

Fig. 2 illustrates a cross-section through the garage building showing a typical storage floor.

Fig. 2ᴬ is a cross-section of the floor taken on line 2ᴬ—2ᴬ of Fig. 2.

Fig. 3 is a plan view of the parking device or parker. The power transmitting rolls are shown in an inactive position, providing clearances between the sides of the automobile tires so that the parking device and its extension may be run under any automobile without interference.

Fig. 4 illustrates a side elevation of the parker showing the tire and body lines of the automobile in dotted lines. It will be noted that the parking device operates in a depression or trough in the floor and that the automobile tires roll on a floor line parallel to, but above the bottom of, the parker operating trough. It will be further noted that the frame of the guiding extension extends upwardly into position to guide the automobile tires, thus maintaining the disengaged automobile wheels in a parallel line with the parking device.

Fig. 5 is an enlarged sectional plan taken on line 5—5 of Fig. 6 showing a pair of power transmitting rolls in cross-section and projecting into a driving position.

Fig. 6 is an enlarged end elevation showing the depression or trough in the floor in which the parking device operates. The power transmitting rolls are shown projected into driving position ready to transmit rotary driving power to the automobile tires shown in dotted lines, as soon as the parking device is moved forward or backward by means of its own operating mechanism.

Fig. 11 is a diagrammatic view showing the driving elements of the parker in engagement with the automobile tire and driving it in one direction, and Fig. 12, is a similar view showing the parker driving the automobile wheels in the opposite direction.

Fig. 13 is a plan view (showing parts in section) of the two sets of power transmitting rolls, one set of such rolls being shown projected into position to act upon the tread of the automobile tire.

Figure 1:
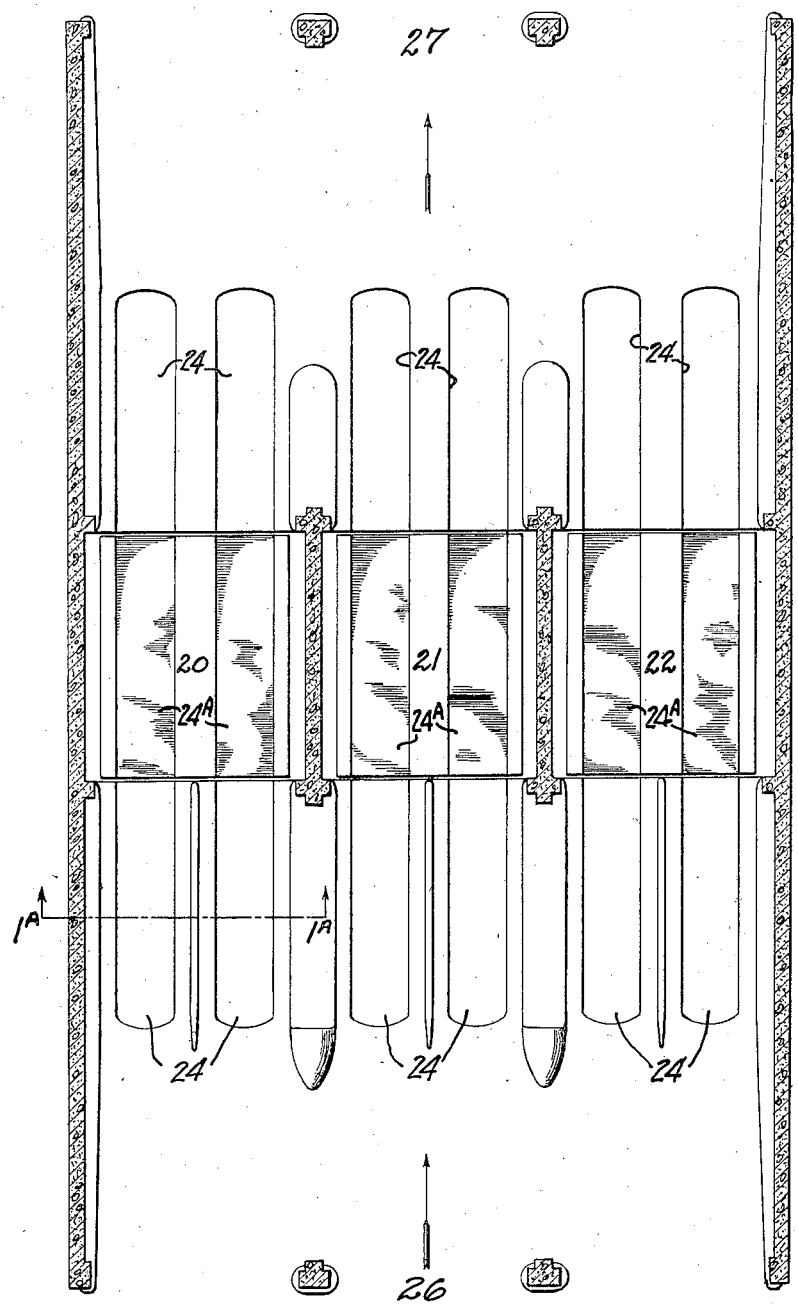

In illustrating my invention, I have chosen an electric motor as a power unit for driving the parking device, this being a convenient type of apparatus for the purpose.

Fig. 14 is a diagram of the electric circuit required to operate the parker with the necessary limit switches and electric relays.

I have not illustrated the machinery for operating the elevators which carry the parker and its automobiles (to be parked) to the various floors in the building. Such machinery or elevating apparatus being well known in the art need no detailed description or illustration herein. Furthermore, in showing a characteristic application of my invention, I have preferred to show a building having three elevators, thus providing for the handling of six cars during any given period of time.

As illustrated, the three elevators are indicated by numerals 20, 21, and 22, and are suitably arranged to carry their load from the ground floor to any of the upper floors of the building.

For each elevator, there are two parkers 23, which operate within the depression or trough guide-way 24. There is also provided a similar guide-way 24ᴬ, on the elevator platforms.

Each floor of the building is provided with similar guide-ways 24, for the parking device, and these guide-ways extend to the full length or breadth of the building, as the case may be, on opposite sides of the elevator or elevator shafts.

Obviously, the length of the guideways 24 and the number of the elevators together with the number of storage floors, determines the capacity of the parking space in the building.

Figure 2:
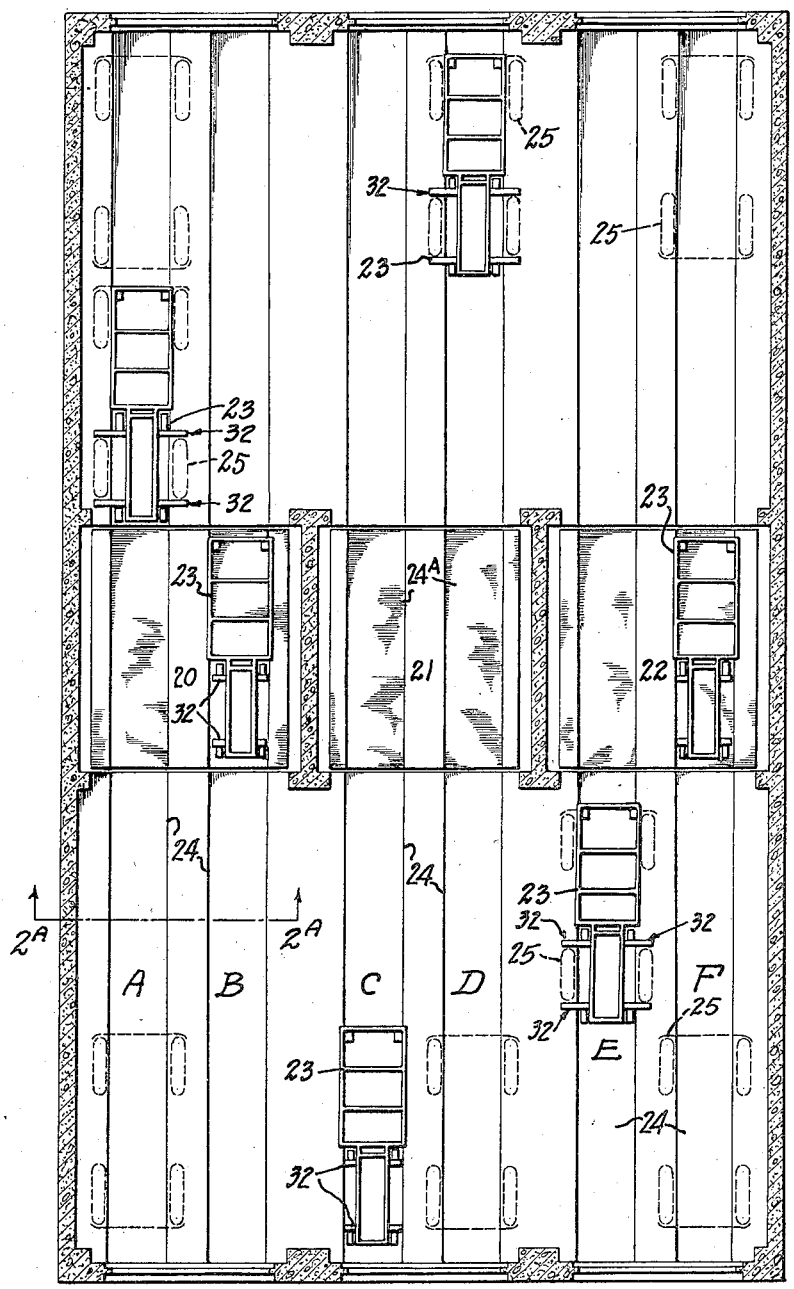
Figure 2A:
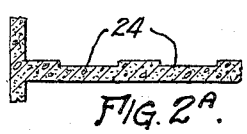

Referring to Fig. 2, the parking lanes are for purposes of description indicated as A, B, C, D, E and F, and the parker in lane A is illustrated as having engaged the rear wheels of the automobile 25 and is ready to propel the automobile on to the elevator platform, the extension at the same time guiding the front wheels in a line parallel with the parking device.

The parker operable in lane B is on the elevator 20. The parker in lane C is shown in its remotest position from the elevator 21 while the parker in lane D is shown ready to move a car to elevator 21. The parker in lane E is in position to move a car onto elevator 22 and the parker in lane F is positioned on the elevator 22.

It is believed that the method of handling the automobiles is readily apparent from the above brief outline.

Automobiles are driven into the building through the entrance 26 and left in one of the guide-ways leading to the elevators. Parking devices are then moved into position to engage the wheels of the automobile and transmit power thereto for rotating the wheels, thus rolling the car forward onto the elevator. The elevators are then raised to the desired floor and the parkers then roll the automobiles from the elevators along the guide-ways 24 to a given position. The parkers are then disconnected from their driving position and may be moved back and forth under the lane of cars or may be moved onto the elevator and carried to any other desired floor for handling automobiles (by rolling their wheels) to the elevator, to deliver said automobiles to the ground floor and into the guide-ways at the exit side 27 of the building.

In the accompanying drawings, the automotive device for supplying the power for moving the automobiles is for convenience termed "a parker" which is of a comparatively simple and sturdy construction and is illustrated as utilizing an electric motor for developing the necessary power.

Obviously, any form of power, as for instance, hydraulics or compressed air, might be utilized and would fall within the scope of the invention.

The parker consists of a sturdy frame 28, preferably made of channel iron. This frame 28 forms a complete chassis for supporting the motor "P", the reduction gear unit "T", and the chain housing "X", which transmits the motive power to driving axles 29 and 30, which in turn transmit power to driving wheels 29A and 30A.

The chain speed gear reduction unit "T" and the chain drives enclosed in case X are merely exemplary and when desired, any suitable speed reduction and drive may be interposed between the source of power P, and the axle shafts 29 and 30.

Parallel to each of the driving axles 29 and 30, are rocker pins 31 which with their opposite rocker pins 31 are supported in the longitudinal channel members of the frame 28 and serve as pivotal pins for power transmitting rolls assemblies generally indicated by number 32.

Power transmitting rolls 32A are slidable within these supporting tube assemblies 32. These power transmitting rolls 32A are shown in an inactive position in Fig. 3, and may be projected outward beyond the ends of driving wheels 29A and 30A, into a position fore and aft of an automobile tire, without bringing them in contact with the driving wheels of the parker. This is illustrated in Figs. 5 and 6.

The power transmitting roll assemblies 32 each comprise a motor S with a gear case Q and form a rigid self-contained operating unit for projecting or withdrawing the power transmitting rolls 32A. These supporting tube assemblies are supported in pivotal arms 33 which are pivotally supported on the pins 31. It is therefore evident that when the power transmitting rolls 32A are projected into operating position, that the rocker arm 33 may be rocked on the pivots 31 so that contact is made either with driving wheels 29A or 30A or with the outside of the automobile tire shown in dotted lines.

The power transmitting rolls 32A are normally kept out of contact with the parker driving wheels 29A and 30A by means of an interconnecting spring 34 which retains the power transmitting tube assemblies in an inactive position. Adjustable stops 35 in the form of screws mounted in the gear reduction unit T are provided as abutments for the casings Q.

The power transmitting rolls 32A may, to give greater traction in driving, be knurled or covered with rubber, cork or any other suitable material for preventing slippage. The wheels 29A and 30A are preferably so covered, as indicated in the drawings.

Figure 7:
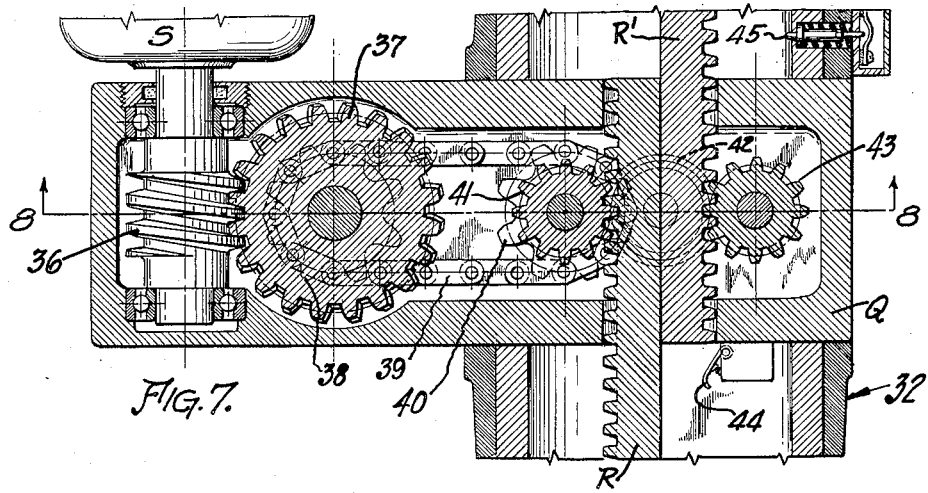
Fig. 7 is an enlarged cross section showing the mechanism which projects the power transmitting rolls into driving position and which returns them to inactive position when not handling an automobile.
Figure 8:
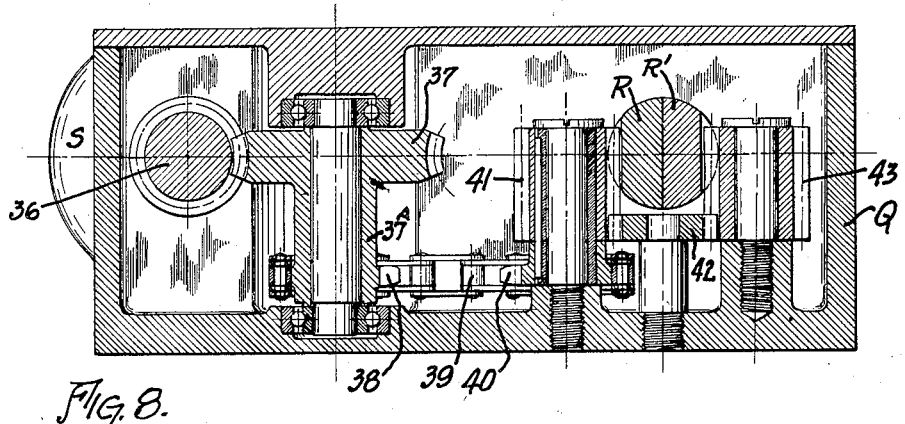
Fig. 8 is a sectional elevation taken on section 8—8 of the Fig. 7.
Figures 9, 10:
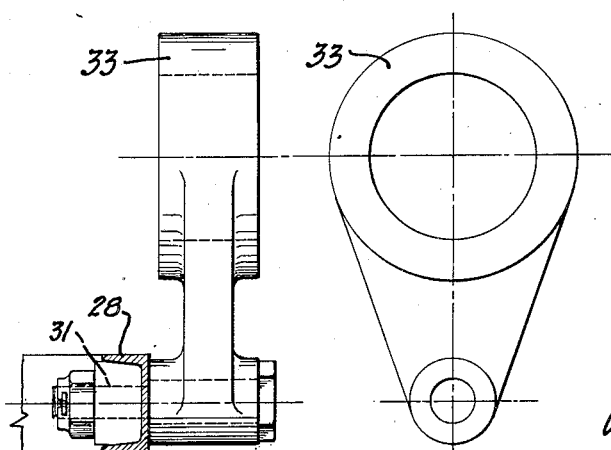
Fig. 9 is an enlarged end view of the rocker arm which supports the power transmitting rolls assembly.
Fig. 10 is a side view of the rocker arm.

The operation by which the power transmitting rolls are projected outward into driving position and returned to inactive position is as follows:

The cooperating pairs of driving roll assemblies are each provided with a motor S which drives the worm 36 and worm wheel 37. The power is then transmitted to a sprocket 38 which is rotatable with the extension 37A of the worm wheel 37 and thence by chain 39 to sprocket 40 which is formed integral with a spur gear pinion 41 which meshes with rack R and with spur pinion 42. The pinion 42 transmits rotation to the pinion 43 which meshes with rack R. Racks R and R' are free to slide upon each other as shown in Figs. 7 and 8. It is now evident that motor S revolves the worm 36 and worm wheel 37 so that reverse rotary motion is then transmitted to spur pinions 41 and 43 which in turn project and return to their original position the oppositely movable racks R and R'. A suitable limit switch 44 in circuit with motor S is provided to limit the outward projection of racks R and R'. An additional limit switch as 45 controls the inward travel of the power transmitting rolls.

The outer end of each rack R and R' is secured to a sleeve 46 by two rivets 46A. The sleeve 46 bears directly against one end of a coil spring 47 the other end of which presses against a retaining nut 48 which is threaded within the end of tube 49. Spaced bearing sleeves 50 are provided to permit free rotation of the tubular power rolls 32A which, with their caps 32B are free to revolve on the spaced bearings 50. The entire tube assembly with bearings and power transmitting roll 32A is retained as an operating unit by lock nut 51.

Stop pins 52 retain the sleeves 46 and spring 47 in position within the tube 49.

It is evident that if the motor S is operated in one direction, the racks R and R' will project the power transmitting rolls 32A into proper driving position and a reversal of the motor S will draw the power transmitting rolls back into the tubular assembly casing 32.

In projecting the power transmitting rolls 32A into their driving position and assuming an obstruction exists, such as the side of the automobile tire, as shown in Fig. 13, the racks R and R' with their sleeves 46 will be projected into their extreme limited outside position but the springs 34 will be compressed.

The roll cap 32B is made with a spherical face. If the parker is operating in the direction of the arrow, as shown in Fig. 13, the moment the partially projected power transmitting rolls will have pased the obstruction of the automobile tire, the springs 34 will immediately project the rolls 32B into their proper driving position. The spherical cap 32B in the meantime has rolled upon the side of the automobile tire without injury to the tire or power transmitting roll.

In order to retain the other or operatively disengaged wheels of the automobile in a line of travel parallel with the parker, an extension guide is provided which is shown in Figures 3 and 4. This extension guide consists substantially of a heavy tubular frame 53 of sufficient length to extend beyond the length of the longest automobile and of sufficient width to about touch the inner sides of the tires of the other wheels.

This extension has freely moving tubular rollers 54 along the entire length of each side and the entire extension is supported on wheels 55 which roll along the botton of the depression or trough in which the parker operates. This extension projects above the floor line on which the automobile tire rolls. Consequently, the rollers 54 bear against the inner side or face of the automobile tire. If the automobile tire is not in a line directly parallel with the movement of the parking device, the rollers 54 will tend to straighten the path of the automobile and will retain the automobile in the proper line of travel, corresponding to that of the parking device.

The parker is maintained in proper alignment within the depressed guide-way 24 by means of laterally disposed rollers or wheels 56 which are mounted on supporting brackets 57 secured to the parker frame. The extension 53 is also provided with laterally disposed guide wheels 58 which are mounted on supports 59 which depend from the frame 53. The wheels 56 and 58 of the parking apparatus are so positioned that any sidewise movement of the parker against the vertical side walls of the guide-way 24 will bring these wheels into contact with such wall and thus facilitate a smooth movement of the parker.

Throughout the drawings, the automobile tire is illustrated in dotted outline and it will be apparent that when the automobile is to be moved, a pair of rolls 32A is projected on opposite sides of the tires of each of the two wheels to be engaged.

With the power transmitting rolls 32A projected into driving position, as soon as the parker is moved by the driving motor P, one or the other pair of the power transmitting rolls 32A is brought into contact with the tire and thereupon is forced backward against the tension of spring 34 into operative contact with the corresponding driving wheels 29A and 30A of the parker. Thus, the power which drives the parker is transmitted by its wheels 29A or 30A to the power transmitting rolls 32A which are in contact with the automobile tires. The rolls then act as a transmission device for rotating the wheels of the automobile. The direction of movement of the automobile is controlled by the direction of movement of the parker and obviously, it will be rolled on its own tires backward or forward, dependent upon which of the pair of transmitting rolls 32A are brought into contact with the tires.

Referring to Figure 14 which represents a schematic wiring diagram of the electric control for the parking device, 60, 61, 62 and 63 indicate relays. These relays are standard electrical equipment and each relay has two normally open electrical contacts, respectively, contacts 60A and 60B, and 61A and 61B, 62A and 62B and 63A and 63B.

The limit switches 64, 65, 66 and 67 control the outer and inner limits of travel of the racks R and R' by indirectly making or breaking the electric current to the motors S and S'.

Limit switches 65 and 67 control the outward travel of the racks operated by motors S and S' respectively. Limit switches 64 and 66 control the inward movements of these same racks.

The source of the 3-phase alternating current is shown at 68. The power conductors are connected to four 3-pole electric switches 69, 70, 71 and 72. Switch 69 causes the extension of the power transmitting rolls to be moved to the outward position by operating the motors S and S' in the proper direction. Switch 70 causes these same rolls to be withdrawn by operating the motors S and S' in the reverse direction.

Switches 71 and 72 control the direction of rotation of the motor P, and hence the direction the parker will move, either forward or reverse direction.

The switches 69, 70, 71 and 72 are wired to perform their various functions according to the standard electrical practice of reversing the phases in the motor.

73 indicates a standard 6-conductor flexible electrical cable which transmits the power from the stationary switches 69, 70, 71 and 72 to the various relays and motors on the movable parker.

When the switch 69 is closed the wires 77, 78 and 79 and the relay coils 61 and 63 are energized and the relay contacts 61A, 61B, 63A and 63B are closed. This completes all three phases to the motors S and S'. These motors then rotate in the proper direction so that the power transmitting rolls are moved into outward position so as to be ready to contact the automobile tires.

When the racks R and R' have moved to the outward limit of their travel, limit switches 65 and 67 are mechanically opened. This breaks the circuit through the relay coils 61 and 63 because they have been deenergized, thus stopping the motors S and S' since the relay contacts 61A, 61B, 63A and 63B have been opened.

To cause an inward movement of the racks R and R' and their cooperating rolls, switch 70 is closed. Wires 76, 78 and 79 are thereupon energized and the relay coils 60 and 62 are energized.

Relay contacts 60A, 60B, 62A and 62B are therefore closed and all three of the phases to the motors S and S' are completed but in such a way that the motors rotate in the opposite direction than before. The racks R and R' are then pulled inwardly, drawing in the power transmitting rolls. As soon as these racks reach a predetermined position the limit switches 64 and 66 are opened and the relay coils 60 and 62 are deenergized to thereby open the relay contacts 60A, 60B, 62A and 62B causing motors S and S' to stop.

When the switches 71 or 72 are closed, wires 74, 75 and 77 are energized. These circuits lead directly to the motor P and cause the motor to rotate in either one direction or the other depending upon which switch is closed.

The distance of travel of the parker when operated by motor P is dependent entirely upon the length of time the switch 60 or 61 is closed, and is in the present instance under the discretionary manual control of the operator.

It is obvious, that the automobile cannot overrun the parker as it will be immediately stopped by the action of the other of the power transmitting rolls. In fact, it can only move as fast as the parker moves.

It will be apparent that the parker exerts not only a direct pushing effect to overcome the inertia of the automobile, but actually acts as a power drive for rotating the automobile wheels engaged thereby.

It will be noted that the automobile is never moved from its normal position of traveling on the ground surface and therefore, no strains whatever are placed upon the springs or other running gears on the chassis to move the automobile from one position to another.

The parker must obviously be capable of movement in two directions, forward and backward and therefore the power driven unit for the parker is reversible. Obviously, the details and construction of the parker may be modified to suit the exigencies of any particular requirement.

The drawings and explanations herein given show and describe a preferred form of the device.

The elemental forms which will function to secure the result expressed may be modified to any degree without changing the spirit or intent of the invention.

I claim:

1. A parker for handling an automobile and comprising a frame, supporting wheels for said frame, power-driven means on said frame for driving said wheels, power-transmitting rolls, means pivotally supporting said rolls on said frame, said rolls being slidably mounted on said pivotal means and normally out of contact with said frame-supporting wheels, means for moving said power-transmitting rolls outwardly to engage the tires of a pair of axially-aligned wheels of the automobile, said means for moving said rolls outwardly being reversible to move said rolls inwardly to disengage them from said automobile wheel tires, said pivotal means being adapted to position said rolls relatively to said automobile wheel tires and said frame-supporting wheels to thereby transmit rotary motion from said frame-supporting wheels to said automobile wheels, and resilient means which permit the arrest of the movement of the rolls in the event either or both of said rolls engage an obstruction during their longitudinal outward movement by said means, said resilient means being adapted to force said rolls to their extreme outward position upon disengagement with the obstruction.

2. An apparatus for moving an automobile from one place to another having a frame and supporting wheels mounted on said frame, a motor on said frame for driving said wheels, power-transmitting rolls, said rolls being adjustable toward and away from said wheels and longitudinally of their axes, mechanism for moving said rolls in a longitudinal direction, power means independent of said motor for actuating said mechanism, said rolls, when extended outwardly along their longitudinal axes, forming an intermediate power driving means between the axially-aligned tires of a pair of automobile wheels and a pair of said frame-supporting wheels to thereby impart rotary driving motion to said pair of automobile wheels, and resilient means which permit the arrest of the movement of the rolls in the event either or both of said rolls engage an obstruction during their longitudinal outward movement by said mechanism, said resilient means being adapted to force said rolls to their extreme outward position upon disengagement with the obstruction.

3. A parker for handling an automobile adapted to be projected under the automobile for operative engagement with the tires of a pair of the automobile wheels and comprising a frame, supporting wheels for said frame, a motor on said frame adapted for propelling the parker forward and backward on said frame-supporting wheels, a plurality of pairs of roll assemblies, each roll assembly being pivotally mounted on the parker and comprising a pair of rolls, said rolls being movable toward and away from the frame-supporting wheels and longitudinally of their axes, a mechanism for moving said rolls outwardly to form an intermediate driving element between the frame-supporting wheels and the tires of a pair of the automobile wheels, said mechanism being reversible to move said rolls inwardly into inoperative position, a motor for said mechanism, said mechanism and its motor being movable as a unit with the roll assembly, and resilient means which permit the arrest of the movement of the rolls in the event either or both of said rolls engage an obstruction during their longitudinal outward movement by said mechanism, said resilient means being adapted to force said rolls to their extreme outward position upon disengagement with the obstruction.

4. A parker for handling an automobile adapted to be projected under the automobile for operative engagement with the tires of a pair of the automobile wheels and comprising a frame, supporting wheels for said frame, a motor on said frame adapted for propelling the parker forward and backward on said frame-supporting wheels, a plurality of pairs of roll assemblies, each roll assembly being pivotally mounted on the parker and comprising a pair of rolls, said rolls being movable toward and away from the frame-supporting wheels and longitudinally of their axes, a mechanism for moving said rolls outwardly to form an intermediate driving element between the frame-supporting wheels and the tires of a pair of the automobile wheels, said mechanism being reversible to move said rolls inwardly into inoperative position, a motor for said mechanism, said mechanism and its motor being movable as a unit with the roll assembly, and an extension of said parker for guiding the disengaged pair of the automobile wheels.

5. A parker for handling an automobile adapted to be projected under the automobile for operative engagement with the tires of a pair of the automobile wheels and comprising a frame, supporting wheels for said frame, a motor on said frame adapted for propelling the parker forward and backward on said frame-supporting wheels, a plurality of pairs of roll assemblies, each roll assembly being pivotally mounted on the parker and comprising a pair of rolls, said rolls being movable toward and away from the frame-supporting wheels and longitudinally of their axes, a mechanism for moving said rolls outwardly to form an intermediate driving element between the frame-supporting wheels and the tires of a pair of the automobile wheels, said mechanism being reversible to move said rolls inwardly into inoperative position, a motor for said mechanism, said mechanism and its motor being movable as a unit with the roll assembly, and means on the parker for guiding the disengaged pair of the automobile wheels.

6. A parker for handling an automobile adapted to be projected under the automobile for operative engagement with the tires of a pair of the automobile wheels and comprising a frame, supporting wheels for said frame, a motor on said frame adapted for propelling the parker forward and backward on said frame-supporting wheels, a plurality of pairs of roll assemblies, each roll assembly being pivotally mounted on the parker and comprising a pair of rolls, said rolls being movable toward and away from the frame-supporting wheels and longitudinally of their axes, a mechanism for moving said rolls outwardly to form an intermediate driving element between the frame-supporting wheels and the tires of a pair of the automobile wheels, said mechanism being reversible to move said rolls inwardly into inoperative position, a motor for said mechanism, said mechanism and its motor being movable as a unit with the roll assembly, and an extension hingedly connected to the parker for guiding the disengaged pair of the automobile wheels.

7. A parker for handling an automobile and comprising a frame, supporting wheels for said frame, power-driven means on said frame for driving said wheels, power-transmitting rolls, means pivotally supporting said rolls on said frame, said rolls being slidably mounted on said pivotal means and normally out of contact with said frame-supporting wheels, means for moving said power-transmitting rolls outwardly to engage the tires of a pair of axially-aligned wheels of the automobile, said means for moving said rolls outwardly being reversible to move said rolls inwardly to disengage them from said automobile wheel tires, said pivotal means being adapted to position said rolls relatively to said automobile wheel tires and said frame-supporting wheels to thereby transmit rotary motion from said frame-supporting wheels to said automobile wheels, and means which permit the arrest of the movement of the rolls in the event either or both of said rolls engage an obstruction during their longitudinal outward movement by said means, said means being adapted to force said rolls to their extreme outward position upon disengagement with the obstruction.

8. An apparatus for moving an automobile from one place to another having a frame and supporting wheels mounted on said frame, a motor on said frame for driving said wheels, power-transmitting rolls, said rolls being adjustable toward and away from said wheels and longitudinally of their axes, mechanism for moving said rolls in a longitudinal direction, and power means independent of said motor for actuating said mechanism, said rolls, when extended outwardly along their longitudinal axes, forming an intermediate power driving means between the axially-aligned tires of a pair of automobile wheels and a pair of said frame-supporting wheels to thereby impart rotary driving motion to said pair of automobile wheels, and means which permit the arrest of the movement of the rolls in the event either or both of said rolls engage an obstruction during their longitudinal outward movement by said mechanism, said means being adapted to force said rolls to their extreme outward position upon disengagement with the obstruction.

9. A parker for handling an automobile adapted to be projected under the automobile for operative engagement with the tires of a pair of the automobile wheels and comprising a frame, supporting wheels for said frame, a motor on said frame adapted for propelling the parker forward and backward on said frame-supporting wheels, a plurality of pairs of roll assemblies, each roll assembly being pivotally mounted on the parker and comprising a pair of rolls, said rolls being movable toward and away from the frame-supporting wheels and longitudinally of their axes, a mechanism for moving said rolls outwardly to form an intermediate driving element between the frame-supporting wheels and the tires of a pair of the automobile wheels, said mechanism being reversible to move said rolls inwardly into inoperative position, a motor for said mechanism, said mechanism and its motor being movable as a unit with the roll assembly, and means which permit the arrest of the movement of the rolls in the event either or both of said rolls engage an obstruction during their longitudinal outward movement by said mechanism, said means being adapted to force said rolls to their extreme outward position upon disengagement with the obstruction.

WILLIAM J. AITKEN.